Figure 1:
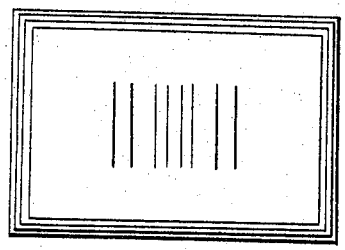

B. Day,
Engraving Plates.

Nº 42,530. Patented Apr. 26, 1864.

Witnesses.
Lemuel W. Serrell.
Thos. Geo. Harold.

Inventor.
Benjamin Day

UNITED STATES PATENT OFFICE.

BENJAMIN DAY, OF HOBOKEN, NEW JERSEY, ASSIGNOR TO W. G. LORD, C. PONOMAREFF, AND J. S. TALBOT, OF NEW YORK CITY, N. Y.

IMPROVEMENT IN RELIEF-PRINTING PLATES.

Specification forming part of Letters Patent No. 42,530, dated April 26, 1864.

*To all whom it may concern:*

Be it known that I, BENJAMIN DAY, of Hoboken, in the county of Hudson and State of New Jersey, have invented, made, and applied to use a certain new and useful Improvement in Relief-Printing Plates; and I do hereby declare the following to be a full, clear, and exact description of the said invention, reference being had to the annexed drawings, making part of this specification.

In Letters Patent granted November 13, A. D. 1860, to D. W. C. Hitchcock, E. B. Larchar, and E. M. Larchar, a mode of preparing surfaces in relief for printing is set forth, consisting, generally, of a surface of chalk, clay, or similar material, upon which the drawing is made with liquid silex or other material that will penetrate sufficient to harden the chalk or other material, that it may resist a subsequent brushing or rubbing operation that removes the surface of such chalk, leaving the lines in relief. In this method of producing a relief for a printing-surface difficulty arises from the silica, or other hardening ink, spreading as it penetrates the chalk, hence precluding the possibility of obtaining very fine lines, and rendering the lines rough on their edges, marring the beauty of the picture printed from such relief plates.

The nature of my said invention consists in drawing upon such surface of prepared chalk, clay, or similar material with a non-penetrating ink having sufficient body or strength in itself to resist the subsequent brushing or rubbing operations that remove the surface of the chalk or other material at the parts which are not protected by such ink, and thereby leaving the drawing in relief. I have found that an ink prepared of glue dissolved in water, with the addition of a small quantity of sugar, and sufficient of lamp-black or coloring-matter to render the lines visible, will easily produce the desired effect of light and shade on the drawing. It will be evident that any other materials might be employed for forming the ink, provided said ink would not penetrate the surface of chalk or similar material, but remain on the surface as a coating or protection to the parts to which it is applied.

After the drawing has been made the brushing or rubbing operation is to be performed, for the objects and as set forth in aforesaid Letters Patent, and the surface or block is to be hardened by saturating it with liquid silica or other suitable material, and the aforesaid ink that stands above the surface of the block may be washed off, so that said surface shall be smooth and adapted to the reception of ink for printing, or for taking impressions for stereotyping or electrotyping.

Figure 2:
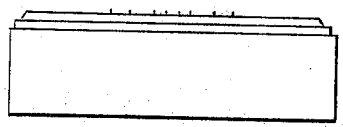
Figure 3:
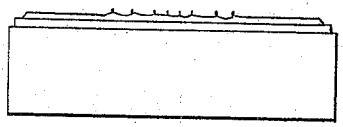
Figure 4:
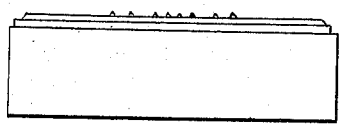

In the drawings I have illustrated lines drawn on a prepared surface of clay or other material in the plan and section, Figures 1 and 2. Fig. 3 is a section representing the plate after the non-protected surface has been brushed or rubbed away, and Fig. 4 illustrates the printing-plate after hardening and washing off the ink from the surface.

What I claim, and desire to secure by Letters Patent, is—

Preparing a surface of chalk, clay, or similar material with an ink that does not penetrate but adheres to the said surface and protects the same while brushed or rubbed for producing a relief-printing surface, as specified.

Dated February 4, 1864.

BENJAMIN DAY.

Witnesses:
LEMUEL W. SERRELL,
THOS. GEO. HAROLD.